US010516267B2

(12) United States Patent
Yoo et al.

(10) Patent No.: US 10,516,267 B2
(45) Date of Patent: Dec. 24, 2019

(54) METHOD AND ITS SYSTEM OF MANAGEMENT OF PRIORITY-BASED ENERGY DISTRIBUTION

(71) Applicant: Electronics and Telecommunications Research Institute, Daejeon (KR)

(72) Inventors: Yoon-Sik Yoo, Daejeon (KR); Il Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 15/844,183

(22) Filed: Dec. 15, 2017

(65) Prior Publication Data

US 2018/0254635 A1    Sep. 6, 2018

(30) Foreign Application Priority Data

Mar. 2, 2017    (KR) .................. 10-2017-0027020
Sep. 5, 2017    (KR) .................. 10-2017-0113433

(51) Int. Cl.
*H02J 3/14*    (2006.01)
*H02J 3/00*    (2006.01)

(52) U.S. Cl.
CPC ............... *H02J 3/14* (2013.01); *H02J 3/008* (2013.01); *H02J 2003/003* (2013.01)

(58) Field of Classification Search
CPC ........ H02J 2003/003; H02J 3/008; H02J 3/14; Y02B 70/3225; Y04S 20/222
See application file for complete search history.

(56) References Cited

U.S. PATENT DOCUMENTS

2008/0231114 A1 *   9/2008   Tolnar .................. H02J 3/14
                                                  307/38
2011/0153107 A1     6/2011   Kim et al.
(Continued)

FOREIGN PATENT DOCUMENTS

CN    104318336 A     1/2015
KR    1020150051419 A   5/2015
(Continued)

OTHER PUBLICATIONS

Yoon-Sik Yoo et al., ICCE-Asia 2016, "Weighted Priority-based Optimal Energy Distribution Scheme", Oct. 28, 2016, pp. 705-707, IEEE, Seoul, South Korea.

*Primary Examiner* — Kenneth M Lo
*Assistant Examiner* — Chad G Erdman
(74) *Attorney, Agent, or Firm* — William Park & Associates Ltd.

(57) ABSTRACT

Disclosed are a priority-based energy distribution method and a priority-based energy distribution system for performing the priority-based energy distribution method. The method may include receiving an energy distribution request including information on demand energy amounts from energy consumers, determining a priority of each of the energy consumers with respect to each of energy suppliers, determining an optimal energy amount of each of the energy consumers based on the determined priority, the demand energy amounts, and available distribution energy resources of the energy suppliers, and distributing energies of the available distribution energy resources to the respective energy consumers based on the determined optimal energy amount.

11 Claims, 4 Drawing Sheets

(56) References Cited

U.S. PATENT DOCUMENTS

| | | | |
|---|---|---|---|
| 2012/0166001 A1 | 6/2012 | Park et al. | |
| 2013/0346057 A1* | 12/2013 | Lin | H02J 3/00 |
| | | | 703/18 |
| 2014/0277797 A1 | 9/2014 | Mokhtari et al. | |
| 2014/0351010 A1* | 11/2014 | Kong | G05F 1/66 |
| | | | 705/7.29 |
| 2014/0371942 A1* | 12/2014 | Matsuyama | H02J 3/14 |
| | | | 700/297 |
| 2014/0379139 A1* | 12/2014 | Dempster | H02J 3/14 |
| | | | 700/276 |
| 2015/0032278 A1* | 1/2015 | Bhageria | H02J 4/00 |
| | | | 700/295 |
| 2016/0239006 A1* | 8/2016 | Mokhtari | H02J 3/14 |
| 2016/0274653 A1* | 9/2016 | Mydlil | G06F 1/26 |
| 2017/0331325 A1* | 11/2017 | Ristau | H02J 3/14 |

FOREIGN PATENT DOCUMENTS

| | | |
|---|---|---|
| KR | 1020150113807 A | 10/2015 |
| KR | 1020160132557 A | 11/2016 |

\* cited by examiner

METHOD AND ITS SYSTEM OF MANAGEMENT OF PRIORITY-BASED ENERGY DISTRIBUTION

CROSS-REFERENCE TO RELATED APPLICATION(S)

This application claims the priority benefit of Korean Patent Application No. 10-2017-0027020 filed on Mar. 2, 2017, and Korean Patent Application No. 10-2017-0113433, filed on Sep. 5, 2017, in the Korean Intellectual Property Office, the disclosure of which is incorporated herein by reference for all purposes.

BACKGROUND

1. Field

One or more example embodiments relate to a method and system for distributing an energy to a consumer, and more particularly, to an optimal energy distribution method and system for distributing available energies to consumers based on priorities of the consumers.

2. Description of Related Art

According to the related art, when an energy is produced through a distribution energy resource, an electric power consumer receives a one-to-one energy request from a single distribution energy resource in response to the electric power consumer requesting energy through a power exchange. That is, the distribution of energy produced through the distribution energy resource is limitedly performed because a relationship between an energy consumer and an energy supplier is not considered.

As more and more distribution energy resources are provided, a greater number of distribution energy resources are disposed in a wider area. Thus, a method of effectively providing an energy based on various relationships, for example, a distance between an energy consumer and an energy supplier, is requested.

SUMMARY

An aspect provides a method and system for minimizing an energy loss by distributing an energy based on a priority of an energy consumer.

Another aspect also provides a method and system for maximizing an energy distribution gain of an energy consumer by distributing an energy based on a priority of the energy consumer.

Still another aspect also provides a method and system for effectively and stably managing a supply and a demand of energy by distributing the energy based on a priority of an energy consumer.

According to an aspect, there is provided a priority-based energy distribution method performed by an energy distribution system, the method including receiving an energy distribution request including information on demand energy amounts from energy consumers, determining a priority of each of the energy consumers with respect to each of energy suppliers, determining an optimal energy amount of each of the energy consumers based on the determined priority, the demand energy amounts, and available distribution energy resources of the energy suppliers, and distributing energies of the available distribution energy resources to the respective energy consumers based on the determined optimal energy amount.

The energy distribution request may include information on a position of each of the energy consumers.

The method may further include receiving a registration request for distribution energy resources from the energy suppliers, registering the distribution energy resources using the received registration request, and determining the available distribution energy resources among the registered distribution energy resources.

The determining of the priority may include determining the priority of each of the energy consumers using a distance between each of the energy consumers and each of the energy suppliers.

The determining of the optimal energy amount may include determining an energy requested by each of the energy consumers as the optimal energy amount of each of the energy consumers in response to a sum of the demand energy amounts being less than or equal to a sum of energy amounts of the available distribution energy resources.

The determining of the optimal energy amount may include determining an energy distribution gain for each of the energy consumers using a weight of the priority, an energy amount of each of the energy consumers, the received energy distribution request, and the determined priority, in response to a sum of energies requested by the energy consumers being greater than a sum of energies of the available distribution energy resources, and determining, as the optimal energy amount, an energy amount of each of the energy consumers corresponding to a maximum sum of the determined energy distribution gains for all of the energy consumers.

The energy distribution gain may be determined using a utility function including the weight of the priority and the energy amount of each of the energy consumers, the received energy distribution request, and the determined priority.

The optimal energy amount may correspond to the maximum sum of the determined energy distribution gains and may be determined using a Karush-Kuhn-Tucker (KKT) condition.

The method may further include evaluating a contribution level of each of the energy suppliers with respect to the distributed energies, and providing the energy suppliers with a reward based on the evaluated contribution level.

The method may further include storing the determined priority in priority history information of each of the energy consumers, and the determining of the optimal energy amount may include determining the optimal energy amount of each of the energy consumers based on the available distribution energy resources of the energy suppliers and the priority history information, the demand energy amounts, and the determined priority.

According to another aspect, there is provided a priority-based energy distribution system for performing a priority-based energy distribution method, the system including a memory configured to store the priority-based energy distribution method, and a processor configured to perform the priority-based energy distribution method, wherein the processor is configured to perform receiving of an energy distribution request including information on demand energy amounts from energy consumers, determining of a priority of each of the energy consumers with respect to each of energy suppliers, determining of an optimal energy amount of each of the energy consumers based on the determined priority, the demand energy amounts, and available distribution energy resources of the energy suppliers, and distributing of energies of the available distribution energy resources to the respective energy consumers based on the determined optimal energy amount.

The processor may be further configured to perform receiving of a registration request for distribution energy resources from the energy suppliers, registering of the distribution energy resources using the received registration request, and determining of the available distribution energy resources among the registered distribution energy resources.

The determining of the optimal energy amount may include determining an energy requested by each of the energy consumers as the optimal energy amount of each of the energy consumers in response to a sum of the demand energy amounts being less than or equal to a sum of energy amounts of the available distribution energy resources.

The determining of the optimal energy amount may include determining an energy distribution gain for each of the energy consumers using a weight of the priority, an energy amount of each of the energy consumers, the received energy distribution request, and the determined priority, in response to a sum of energies requested by the energy consumers being greater than a sum of energies of the available distribution energy resources, and determining, as the optimal energy amount, an energy amount of each of the energy consumers corresponding to a maximum sum of the determined energy distribution gains for all of the energy consumers.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings.

Figure 1:
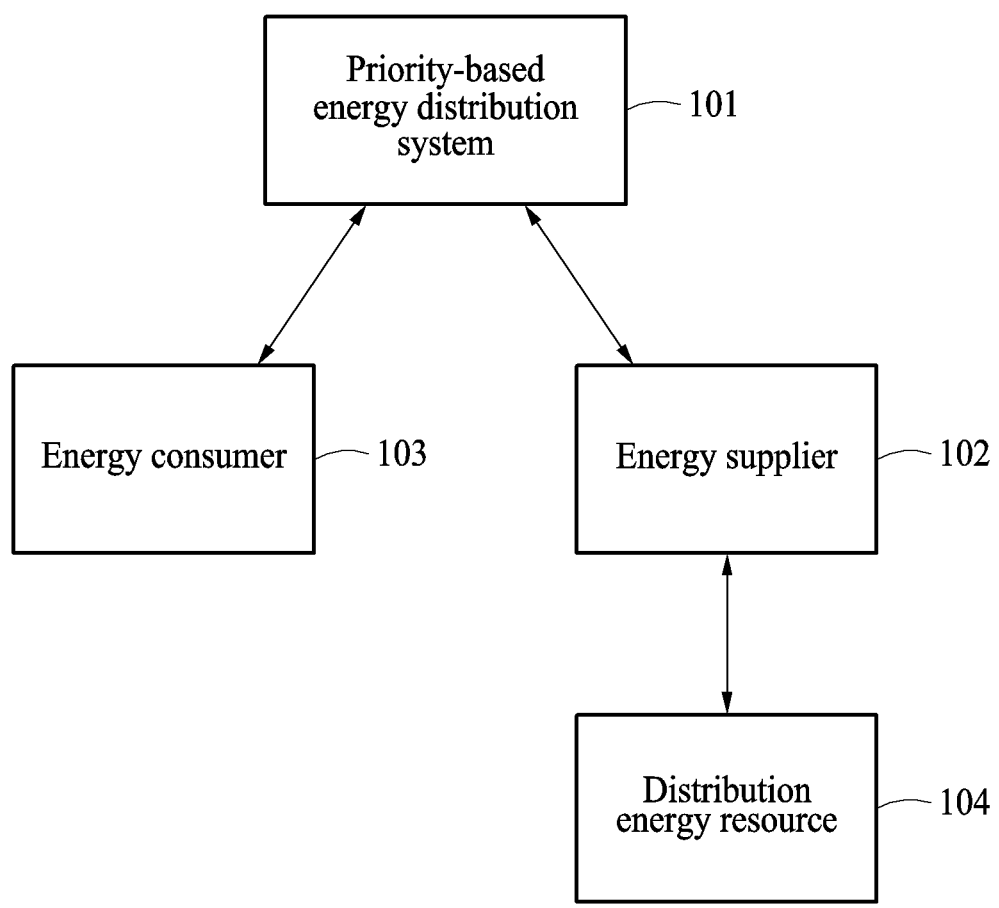
FIG. 1 is a block diagram illustrating a priority-based energy distribution system according to an example embodiment.

FIG. 1 is a block diagram illustrating a priority-based energy distribution system according to an example embodiment.

FIG. 1 illustrates a priority-based energy distribution system 101, an energy supplier 102, an energy consumer 103, and a distribution energy resource 104. The priority-based energy distribution system 101 distributes an energy of the energy supplier 102 to the energy consumer 103. Although FIG. 1 illustrates one energy supplier 102 and one energy consumer 103, these are only examples. A plurality of energy suppliers and energy consumers may be provided.

Each of the priority-based energy distribution system 101, the energy supplier 102, the energy consumer 103, and the distribution energy resource 104 includes a processor. The processor may be a semiconductor device to execute instructions stored in a central processing unit (CPU) or a memory and/or a storage. The memory and the storage may include various types of volatile storages or non-volatile storages. For example, the memory includes a read only memory (ROM) and a random access memory (RAM).

Hereinafter, operations and steps of the priority-based energy distribution system 101, the energy supplier 102, the energy consumer 103, and the distribution energy resource 104 may be performed by the respective processors of the priority-based energy distribution system 101, the energy supplier 102, the energy consumer 103, and the distribution energy resource 104.

Each of energy suppliers, for example, the energy supplier 102, controls at least one of distribution energy resources, for example, the distribution energy resource 104. The distribution energy resource 104 described herein refers to a distributed energy resource (hereinafter, referred to as DER), that is, a generating facility capable of being distributed and placed unlike a large scale of centralized power source. For example, the distribution energy resource 104 refers to a facility using a solar energy, a solar heat, a wind power, a fuel cell, a hydrogen energy, a bio energy, a waste energy, coal gasification, a geothermal power, a hydroelectric power, and a marine energy. The energy supplier 102 may control a generation schedule and a generation amount by controlling the at least one of the distribution energy resources, for example, the distribution energy resource 104. The energy supplier 102 may register the distribution energy resource 104 to the priority-based energy distribution system 101. The energy supplier 102 may receive a reward based on a level of contribution to energy distribution.

The energy consumer 103 may request an energy to be used. Thus, the energy consumer 103 may receive the energy of the energy supplier 102 distributed by the priority-based energy distribution system 101.

The priority-based energy distribution system 101 distributes the energy of the energy supplier 102 and provides the energy to the energy consumer 103. In detail, the priority-based energy distribution system 101 may receive an energy distribution request from the energy consumer 103. Then, the priority-based energy distribution system 101 may determine a priority of the energy consumer 103. Here, the priority indicates a priority assigned to each of energy consumers, for example, the energy consumer 103, to distribute an optimal energy amount to the energy consumer 103 based on a relationship between the energy consumer 103 and the energy supplier 102. For example, the priority-based energy distribution system 101 may determine the priority of the energy consumer 103 based on a distance from the energy supplier 102.

The priority-based energy distribution system 101 may store and analyze a history of the determined priority. The priority-based energy distribution system 101 may determine the optimal energy amount to be distributed to the energy consumer 103 based on the priority of the energy consumer 103 and the analyzed history of the priority. That is, the priority-based energy distribution system 101 may determine the priority of the current energy consumer 103 based on an average value of priorities.

In detail, the priority-based energy distribution system 101 may determine an energy distribution gain of the energy consumer 103 using the priority of the energy consumer 103, the energy distribution request of the energy consumer 103, and the energy amount to be distributed to the energy consumer 103. Here, the energy distribution gain refers to a gain of the energy consumer 103 with respect to the energy to be distributed. The energy distribution gain may be determined based on the energy amount distributed in comparison with a demand energy amount requested by the energy consumer 103.

The priority-based energy distribution system 101 may determine an energy amount corresponding to a maximum sum of energy distribution gains of all of the energy consumers, for example, the energy consumer 103, as the optimal energy amount. Here, the optimal energy amount may be determined based on available distribution energy resource among the distribution energy resources, for example, the distribution energy resource 104, registered in the priority-based energy distribution system 101. Here, the available distribution energy resource 104 may indicate that the energy generation is possible at a point in time at which the priority-based energy distribution system 101 determines an energy amount. That is, the available distribution energy resource 104 may indicate a distribution energy resource capable of generating and providing an energy without a failure or a stop when the priority-based energy distribution system 101 requests energy generation based on the determined energy amount. The priority-based energy distribution system 101 may distribute energies of the available distribution energy resources to the energy consumer 103 based on the determined optimal energy amount.

The priority-based energy distribution system 101 may provide a reward for the energy supplier 102 based on a contribution level of the energy supplier 102 with respect to the energy distribution. Here, the reward includes a deposit of commodity money, a deposit of virtual money, and an offer of reward points.

Figure 2:
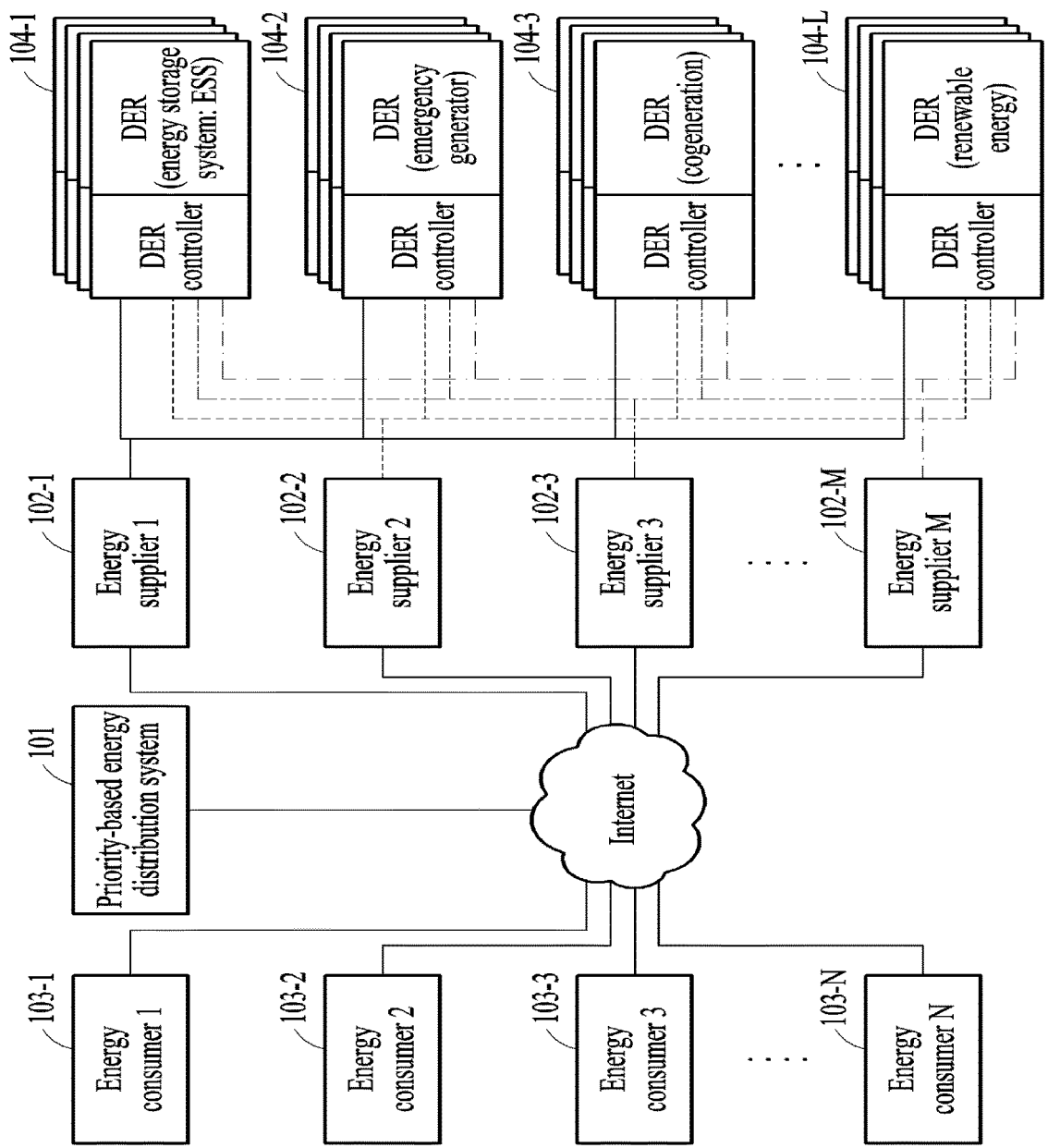
FIG. 2 illustrates a priority-based energy distribution system according to an example embodiment.

FIG. 2 illustrates a priority-based energy distribution system according to an example embodiment.

FIG. 2 illustrates the priority-based energy distribution system 101, energy suppliers 102-1 through 102-M, energy consumers 103-1 through 103-N, and distribution energy resources 104-1 through 104-L. Here, M, N, and L denote predetermined positive integers. M, N, and L are letters indicating that there are at least one of the energy suppliers 102-1 through 102-M, at least one of the energy consumers 103-1 through 103-N, and at least one of the distribution energy resources 104-1 through 104-L, and M, N, and L do not limit the scope of the present disclosure.

As illustrated, the priority-based energy distribution system 101, the energy suppliers 102-1 through 102-M, and the energy consumers 103-1 through 103-N may interact with each other through the Internet. That is, the priority-based energy distribution system 101, the energy suppliers 102-1 through 102-M, and the energy consumers 103-1 through 103-N may transmit and receive, to each other, data for registering the distribution energy resources 104-1 through 104-L, requesting energy distribution, distributing the energy, and providing a reward.

Each of the distribution energy resources 104-1 through 104-L includes a distribution energy resource (DER) controller. Each of the energy suppliers 102-1 through 102-M may control the distribution energy resources 104-1 through 104-L using the DER controller. A different number of the distribution energy resources 104-1 through 104-L may be controlled for each of the energy suppliers 102-1 through 102-M. For example, the energy supplier 102-1 may control three distribution energy resources 104-1 through 104-3, and the energy supplier 102-M may control five distribution energy resources 104-1 through 104-5.

As illustrated, the distribution energy resources 104-1 through 104-L include a renewable energy, a combined heat and power (CHP), an emergency generator, and an energy storage system. The distribution energy resources 104-1 through 104-L may generate or produce the energy. The distribution energy resources 104-1 through 104-L may store the generated or produced energy.

The energy suppliers 102-1 through 102-M may request a registration of the distribution energy resources 104-1 through 104-L to the priority-based energy distribution system 101. For example, the energy supplier 102-1 may request the registration of the distribution energy resources 104-1 through 104-L of the energy supplier 102-1 to the priority-based energy distribution system 101. Then, the priority-based energy distribution system 101 may register the distribution energy resources 104-1 through 104-L of the energy supplier 102-1. The priority-based energy distribution system 101 may distribute the energy produced from available distribution energy resources among the distribution energy resources 104-1 through 104-L of the energy supplier 102-1 to the energy consumers 103-1 through 103-N.

In an example, the energy consumers 103-1 through 103-N may request the necessary energy to the priority-based energy distribution system 101. Then, the priority-based energy distribution system 101 may receive energy distribution requests of the energy consumers 103-1 through 103-N. Also, the energy consumers 103-1 through 103-N may select predetermined energy suppliers from among the energy suppliers 102-1 through 102-M. The priority-based energy distribution system 101 may determine a priority of each of the energy consumers 103-1 through 103-N based on the energy distribution requests.

In an example, the priority-based energy distribution system 101 may determine the priority based on a distance between each of the energy suppliers 102-1 through 102-M and each of the energy consumers 103-1 through 103-N. For example, a priority is determined based on a distance between the energy supplier 102-1 and each of the energy consumers 103-1 through 103-N. Then, the energy of the energy supplier 102-1 may be distributed to each of the energy consumers 103-1 through 103-N based on the determined priority. That is, the priority-based energy distribution system 101 may minimize an energy loss by priorly providing the energy to the energy consumers 103-1 through 103-N that are close to the energy suppliers 102-1 through 102-M. This is because an amount of the energy loss increases as a distance for transmitting the energy increases.

In another example, the priority-based energy distribution system 101 may determine the priority of each of the energy consumers 103-1 through 103-N with respect to each of the energy suppliers 102-1 through 102-M by analyzing position information of the energy suppliers 102-1 through 102-M and the energy consumers 103-1 through 103-N. Then, the priority-based energy distribution system 101 may distribute the energy supplied by each of the energy suppliers 102-1 through 102-M to the energy consumers 103-1 through 103-N having relatively high priorities. For example, the priority of each of the energy consumers 103-1 through 103-N is determined based on a distance from the energy supplier 102-1. When the energy consumer 103-N is closest to the energy supplier 102-1 and then the energy supplier 102-1 is close to the energy consumer 103-1 and the energy consumer 103-2 in order, the priority-based energy distribution system 101 may distribute the energy supplied by the energy supplier 102-1 based on the priority and an energy amount requested by each of the energy consumers 103-1 through 103-N.

The priority-based energy distribution system 101 may profile and store the determined priority as history information. The priority-based energy distribution system 101 may determine the optimal energy amount for each of the energy consumers 103-1 through 103-N by analyzing the history information associated with the priority.

In an example, the priority-based energy distribution system 101 may analyze which one of the energy consumers 103-1 through 103-N has a relatively high priority based on the previously stored history information.

In another example, the priority-based energy distribution system 101 may allow current priorities of the energy consumers 103-1 through 103-N to remain the same as a previous priority based on the history information associated with the priority. When the energy suppliers 102-1 through 102-N that distribute the energy to the energy consumers 103-1 through 103-N are changed, the priority-based energy distribution system 101 may adjust the priority by reflecting distances between the energy consumers 103-1 through 103-N and the changed energy suppliers 102-1 through 102-N.

The priority-based energy distribution system 101 may create a list of the optimal energy amounts of the energy consumers 103-1 through 103-N based on the available distribution energy resources 104-1 through 104-L of the energy suppliers 102-1 through 102-M when determining the optimal energy amounts. The priority-based energy distribution system 101 may distribute the energies of the available distribution energy resources 103-1 through 104-L of the energy suppliers 102-1 through 102-M based on the determined optimal energy amounts.

Figure 3:
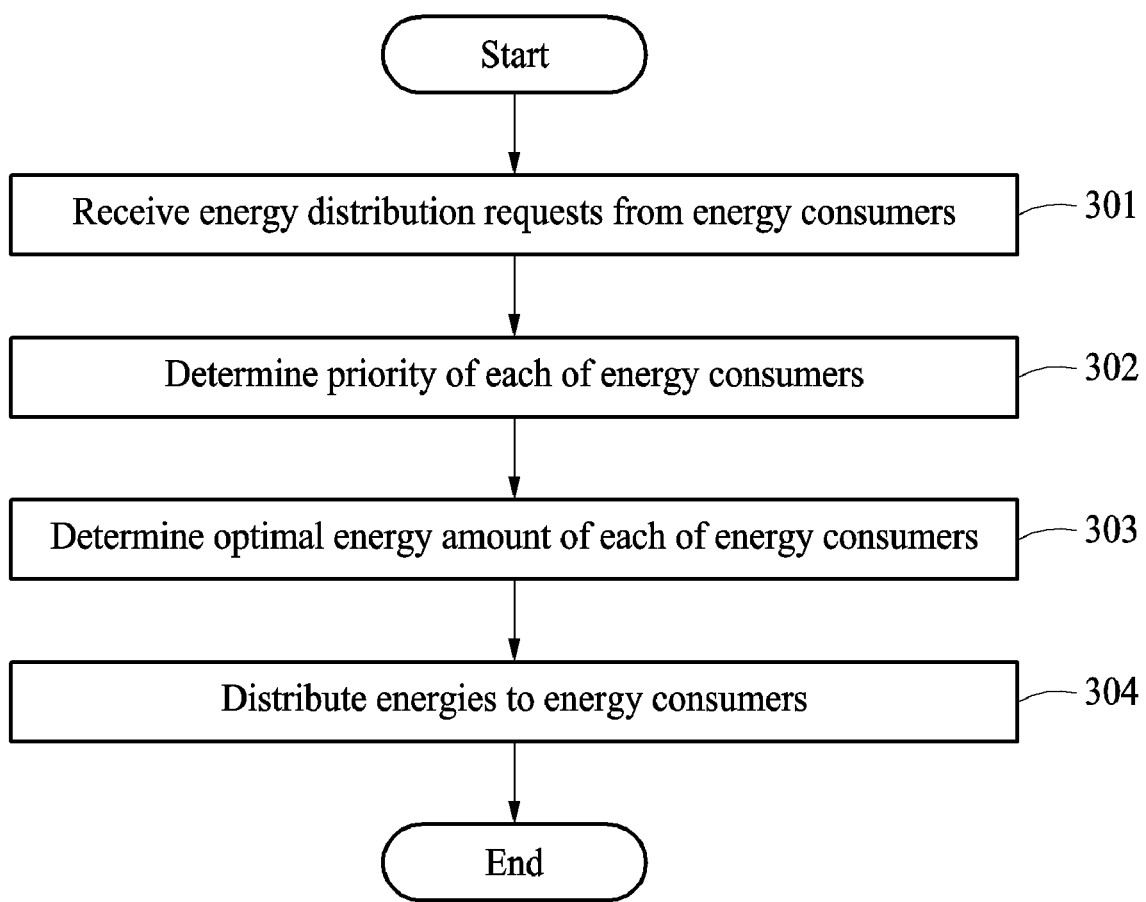
FIG. 3 is a flowchart illustrating a priority-based energy distribution method according to an example embodiment.

FIG. 3 is a flowchart illustrating a priority-based energy distribution method according to an example embodiment.

The priority-based energy distribution system 101 may perform the priority-based energy distribution method described with reference to FIG. 3.

In operation 301, the priority-based energy distribution system 101 receives energy distribution requests from energy consumers, for example, the energy consumer 103. Here, the energy distribution requests may include information on positions of the energy consumers and energy amounts required by the energy consumers. The energy distribution requests may include information on an energy distribution schedule, a desired energy purchase price, and an assignment of energy suppliers, for example, the energy supplier 102. That is, the energy distribution requests may additionally include information on energy trading.

The priority-based energy distribution system 101 may receive, from the energy suppliers, registration requests of the distribution energy resources, for example, the distribution energy resource 104, controlled by the respective energy suppliers. The priority-based energy distribution system 101 may register the distribution energy resources and distribute energies produced by distribution energy resources.

In operation 302, the priority-based energy distribution system 101 determines the priority of each of the energy consumers. The priority-based energy distribution system 101 may determine the priority based on relationships between the energy suppliers and the energy consumers. The relationships between the energy suppliers and the energy consumers may include distances between the energy suppliers and the energy consumers. That is, the priority-based energy distribution system 101 may determine the priority of each of the energy consumers based on the distances.

In operation 303, the priority-based energy distribution system 101 determines an optimal energy amount of each of the energy consumers based on available distribution energy resources of the energy suppliers, the received energy distribution requests, and the priority of each of the energy consumers. Here, the priority-based energy distribution system 101 may determine an energy amount corresponding to a maximum sum of energy distribution gains of all of the energy consumers under a concept of social welfare, and the priority-based energy distribution system 101 may determine this energy amount as the optimal energy amount of each of the energy consumers.

In detail, the priority-based energy distribution system 101 may determine the energy distribution gain of each of the energy consumers with respect to the energy distributed using the available distribution energy resources, the energy distribution requests, and the priorities. In an example, the priority-based energy distribution system 101 uses a logarithmic utility function.

Detailed description about a process by which the priority-based energy distribution system 101 determines the optimal energy amounts using the energy distribution gains of the energy consumers is provided below with reference to Equation 1 through Equation 5. That is, Equation 1 through Equation 5 are associated with a process of determining an optimal energy amount for distributing, by the priority-based energy distribution system 101, the energies produced by the available distribution energy resources of one energy supplier, for example, the energy supplier 102, to each of the energy consumers. Thus, when a plurality of energy suppliers are present, the priority-based energy distribution system 101 may repeatedly perform processes using Equation 1 through Equation 5 on each of the energy suppliers.

$$\max_{P} \Sigma_{j \in J} U_j(P_j) \text{ s.t. } 0 \le P_j \le d_j, \forall j \in J, \Sigma_{j \in J} P_j \le P \qquad \text{[Equation 1]}$$

In Equation 1, $P=(P_1, \ldots, P_N)$ denotes an energy vector to be distributed to each energy consumer, and P denotes a sum of energies produced by all of the available distribution energy resources. That is, P denotes a total amount of energy to be produced by each energy supplier. That is, P may be a redundant energy amount to be provided for the energy consumers. Here, the energy vector may indicate a set of energy elements. Alternatively, P may indicate a sum of energies remaining in each energy supplier. $U_j(P_j)$ denotes an energy distribution gain of each energy consumer, $d=\{d_1, d_2, \ldots, d_N\}$ denotes an energy distribution request vector associated with the energy amount requested by the energy consumer 103, and $J$ denotes a positive integer. $J=\{1, 2, \ldots, N\}$ denotes an index of all of the energy consumers. Also, $\Sigma_{j \in J} U_j(P_j)$ denotes a sum of energy distribution gains of all of the energy consumers.

In an example, the priority-based energy distribution system 101 may determine $P_j$ corresponding to a maximum $\Sigma_{j \in J} U_j(P_j)$ indicating the energy distribution gains of all of the energy consumers when $P_j$ is less than or equal to $d_j$ and a sum of $P_j$ is less than or equal to P. In addition, the priority-based energy distribution system 101 may determine the determined $P_j$ as the optimal energy vector of each of the energy consumers. The energy amount associated with the optimal energy vector may be the optimal energy amount of each of the energy consumers.

That is, the optimal energy vector of each of the energy consumers may be determined using an optimization problem with respect to the energy distribution gain. Detailed description about $U_j(P_j)$ is provided with reference to Equation 2.

$$U_j(P_j) = \eta_j^{\frac{1}{\xi}} \log\left(1 + \frac{P_j}{\xi d_j}\right), \quad \forall j \in \mathcal{J} \quad \text{[Equation 2]}$$

Equation 2 expresses an energy distribution gain of a user using a log utility function. In Equation 2, $\eta = \{\eta_1, \eta_2, \ldots, \eta_N\}$ denotes a priority vector, and $\xi$ denotes a weight factor of the priority. For example, a priority is a ratio of energy loss rate with respect to an energy transmission distance. The priority-based energy distribution system 101 may determine the weight as a predetermined value. The priority may be determined based on a distance between the energy supplier 102 and the energy consumer 103 for transferring an energy. In Equation 2, $U_j(P_j)$ denotes a nonnegative real-valued function, and is proportional to $$\eta_j^{\frac{1}{\xi}}.$$

Also, $U_j(P_j)$ denotes a strictly increasing function with respect to $P_j/d_j$, and a concave function with respect to $P_j$.

Here, the weight indicates a degree of significance of the priority to be applied to determine the optimal energy amount and the energy distribution gain. The weight may be adaptively applied depending on a feedback of the energy supplier 102 and the energy consumer 103. For example, the priority-based energy distribution system 101 may periodically receive the feedback about an energy distribution result from the energy consumers and the energy suppliers. The priority-based energy distribution system 101 may distribute the energy to each of the energy consumers by varying the weight, and optimize the weight using the feedback about the energy distribution result.

When $U_j(P_j)$ of Equation 2 is applied to Equation 1, Equation 3 is obtained.

$$\max_P \sum_{j \in \mathcal{J}} \eta_j^{\frac{1}{\xi}} \log\left(1 + \frac{P_j}{\xi d_j}\right) \quad \text{[Equation 3]}$$
$$\text{s.t.} \ 0 \le P_j \le d_j, \forall j \in \mathcal{J},$$
$$\sum_{j \in \mathcal{J}} P_j \le P.$$

When a sum of the energy amounts requested by the energy consumers is less than or equal to a sum of the energy amounts of the available distribution energy resources (that is, $\sum_{j \in \mathcal{J}} d_j \le P$ is satisfied), $P_j = d_j$ is distributed to all of the energy consumers. That is, the priority-based energy distribution system 101 provides the requested energy amount as the optimal energy amount.

When the sum of the energy amounts requested by the energy consumers is greater than the sum of the energy amounts of the available distribution energy resources (that is, $\sum_{j \in \mathcal{J}} d_j > P$ is satisfied), $P_j$ that satisfies Equation 3 is determined. Because an objective function, $U_j(P_j)$, is strictly concave and all constraints are linear, a Karush-Kuhn-Tucker (KKT) condition with respect to Equation 3 becomes Equation 4.

$$\begin{aligned} & \frac{\eta_j^{\frac{1}{\xi}}}{P_j^* + \xi d_j} + \lambda_j - \tilde{\lambda}_j - \mu = 0, \quad \forall j \in \mathcal{J} \\ & -P_j^* \le 0, P_j^* - d_j \le 0, \quad \forall j \in \mathcal{J} \\ & \sum_{j \in \mathcal{J}} P_j^* - P = 0, \\ & \lambda_j \ge 0, \tilde{\lambda}_j \ge 0, \quad \forall j \in \mathcal{J} \\ & \lambda_j P_j^* = 0, \tilde{\lambda}_j(P_j^* - d_j) = 0, \quad \forall j \in \mathcal{J} \end{aligned} \quad \text{[Equation 4]}$$

Equation 4 expresses the KKT condition with respect to Equation 3. In Equation 4, a first equation expresses a stationary condition, a second equation and a third equation express primal feasibility conditions, a fourth equation expresses a dual feasibility condition, and a fifth equation expresses a complementary slackness condition.

Here, $\lambda_j$, $\tilde{\lambda}_j$ and $\mu$ denote Lagrange multipliers and KKT multipliers. Each of $\lambda_j$, $\tilde{\lambda}_j$ and $\mu$ is associated with a condition to be applied to inequality constraints and equality constraints.

In Equation 4, because an objective function and an inequality constraint function are able to be differentiated, the objective function and the inequality constraint function are convex, and an equality constraint function is associated with an affine, the KKT condition may have an optimal solution.

Thus, the priority-based energy distribution system 101 may determine the optimal energy amount using the KKT condition and the objective function. That is, the priority-based energy distribution system 101 may determine an optimal energy distribution policy as expressed in Equation 5.

$$P_j^* = \begin{cases} \frac{\eta_j^{\frac{1}{\xi}}}{\mu} - \xi d_j, & \text{if } P_j^* > 0 \text{ and } P_j^* < d_j; \\ d_j, & \text{if } P_j^* \ge d_j; \\ 0, & \text{otherwise,} \end{cases} \quad \text{[Equation 5]}$$

Equation 5 expresses the optimal energy amount to be distributed, by the priority-based energy distribution system 101, to each of the energy consumers obtained from Equation 4, that is, the KKT condition. That is, Equation 5 is the optimal energy distribution policy determined by the priority-based energy distribution system 101. Here, $P_j^*$ denotes the optimal energy amount.

In detail, to satisfy $\lambda_j P_j^* = 0$, $\tilde{\lambda}_j (P_j^* - d_j) = 0$ of Equation 4, one of (i) $0 \le P_j^* \le d_j$, (ii) $P_j^* = d_j$, or (iii) $P_j^* = 0$ should be satisfied. The priority-based energy distribution system 101 may determine the optimal energy amount with respect to each case.

In a case of (i) $0 \le P_j^* \le d_j$, $\lambda_j = 0$ and $\tilde{\lambda}_j = 0$ are satisfied to satisfy $\lambda_j P_j^* = 0$, $\tilde{\lambda}_j (P_j^* - d_j) = 0$. Thus, the priority-based energy distribution system 101 may obtain $$P_j^* = \frac{\eta_j^{\frac{1}{\xi}}}{\mu} - \xi d_j$$

from $$\frac{\eta_j^{\frac{1}{\xi}}}{P_j^* + \xi d_i} + \lambda_j - \tilde{\lambda}_j - \mu = 0$$

of Equation 4.

In a case of (ii) $P_j^*=d_j$, $\lambda_j=0$ is satisfied to satisfy $\lambda_j P_j^*=0$, $\tilde{\lambda}_j(P_j^*-d_j)=0$. Thus, the priority-based energy distribution system 101 may obtain $\eta_j^{1/\xi}/\mu - \xi d_j = (\xi+1)d_j\lambda_j/\mu + d_j \geq 0$ from $$\frac{\eta_j^{\frac{1}{\xi}}}{P_j^* + \xi d_i} + \lambda_j - \tilde{\lambda}_j - \mu = 0$$

of Equation 4. $\eta_j^{1/\xi}/\mu - \xi d_j = (\xi+1)d_j\lambda_j/\mu + d_j \geq 0$ is an equation that proves derivation of the optimal energy amount. This equation may always correspond to a range of a condition for indicating the optimal energy amount under a condition corresponding to this equation.

In a case of (iii) $P_j^*=0$, $\tilde{\lambda}_j=0$ is satisfied to satisfy $\lambda_j P_j^*=0$, $\tilde{\lambda}_j(P_j^*-d_j)=0$. Thus, the priority-based energy distribution system 101 may obtain $\eta_j^{1/\xi}/\mu - \xi d_j = -\xi d_j\lambda_j/\mu \leq 0$ from $\eta_j^{1/\xi}/\mu - \xi d_j = -\xi d_j\lambda_j/\mu \leq 0$ of Equation 4. $\eta_j^{1/\xi}/\mu - \xi d_j = -\xi d_j\lambda_j/\mu \leq 0$ is an equation that proves derivation of the optimal energy amount. This equation may always correspond to a range of a condition for indicating the optimal energy amount under a condition corresponding to this equation.

In operation 304, the priority-based energy distribution system 101 distributes the energies of the available distribution energy resources to the energy consumers based on the determined optimal energy amount. The priority-based energy distribution system 101 may distribute the energy to each of the energy consumers based on a result obtained using Equation 5.

In detail, the priority-based energy distribution system 101 may determine the optimal energy policy to be distributed to the energy consumers as expressed in Equation 5. When $P_j^*>0$ and $P_j^*<d_j$ is satisfied, the priority-based energy distribution system 101 may distribute $$P_j^* = \frac{\eta_j^{\frac{1}{\xi}}}{\mu} - \xi d_j$$

to each energy consumer. When $P_j^* \geq d_j$ is satisfied, the priority-based energy distribution system 101 may distribute $P_j^*-d_j$ to each energy consumer. Otherwise, the priority-based energy distribution system 101 may distribute $P_j^*=0$ to each energy consumer.

After the energy is distributed, the priority-based energy distribution system 101 may evaluate a contribution level of each of the energy suppliers. In detail, the priority-based energy distribution system 101 may evaluate a level of contribution of each of the energy suppliers with respect to a sum of amounts of energies distributed to the energy consumers.

The priority-based energy distribution system 101 may provide a reward for the energy suppliers based on the evaluated contribution level. The priority-based energy distribution system 101 may induce the energy suppliers to more actively participate in an energy distributing process by providing the reward for the energy suppliers.

Figure 4:
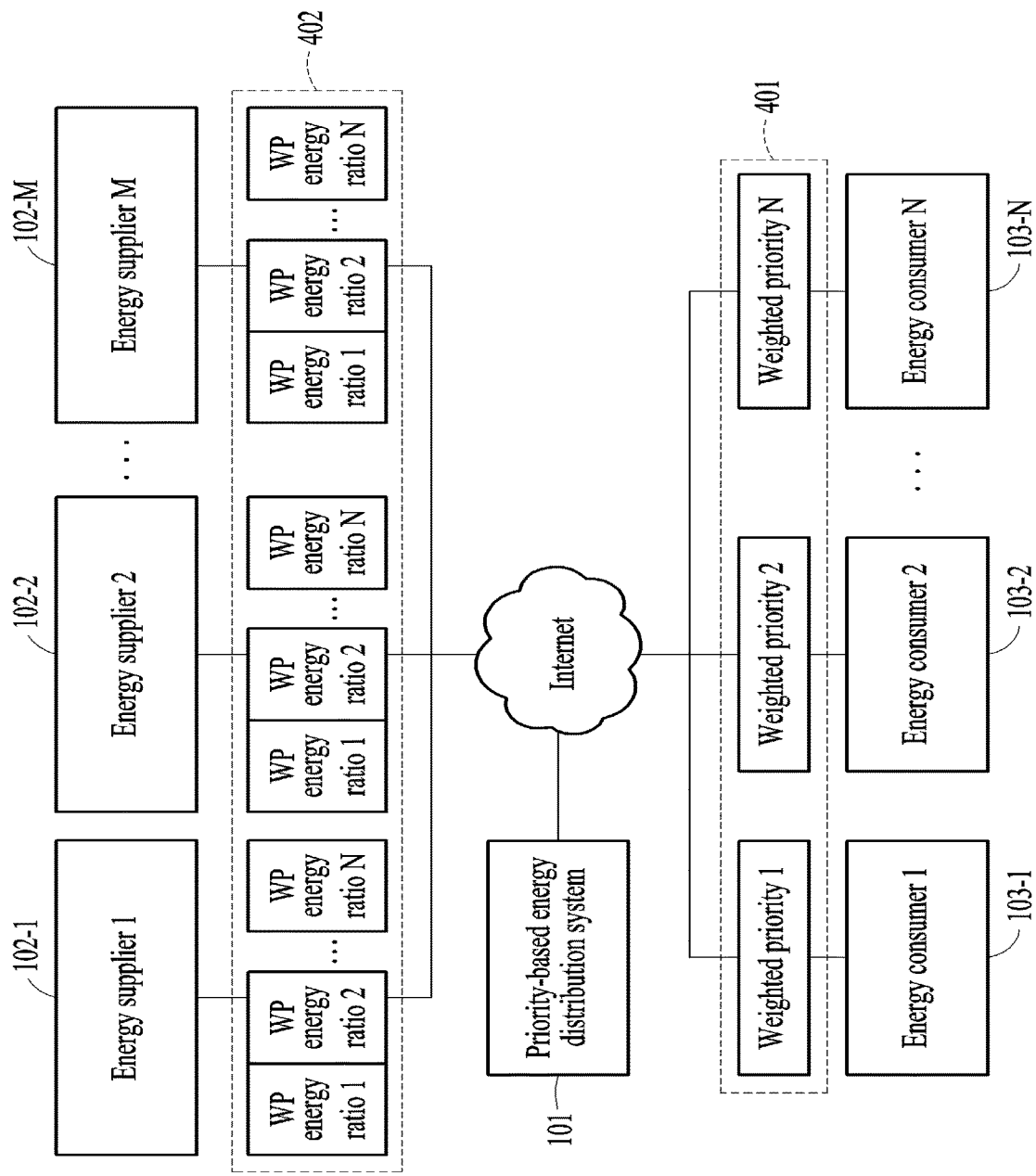
FIG. 4 illustrates a priority-based energy distribution system to which a priority is applied according to an example embodiment.

FIG. 4 illustrates a priority-based energy distribution system to which a priority is applied according to an example embodiment.

FIG. 4 illustrates the priority-based energy distribution system 101, the energy suppliers 102-1 through 102-M, the energy consumers 103-1 through 103-N, a weighted priority 401, and a weighted priority (WP) energy ratio 402.

The weighted priority 401 refers to a priority of each of the energy consumers 103-1 through 103-N to which a weight is applied. The priority-based energy distribution system 101 may determine the weighted priority 401 of each of the energy consumers 103-1 through 103-N, and distribute energies of the energy suppliers 102-1 through 102-M based on the determined weighted priority 401. The priority-based energy distribution system 101 may store the weighted priority 401 to history information.

The WP energy ratio 402 may be determined by the priority-based energy distribution system 101 based on the weighted priority 401. That is, the WP energy ratio 402 refers to a ratio between an energy amount of each of the energy consumers 103-1 through 103-N based on a priority and an energy amount produced by each of the energy suppliers 102-1 through 102-M through the distribution energy resource 104. For example, when an energy of an energy supplier 1, 102-1, is provided for an energy consumer 2, 103-2, an amount of energy corresponding to an energy ratio 2, 402, among all energies of the energy supplier 1, may be provided for the energy consumer 2.

The priority-based energy distribution system 101 may determine a contribution level of each of the energy suppliers 102-1 through 102-M based on the supplied energy amount based on the WP energy ratio 402. The priority-based energy distribution system 101 may provide a reward to each of the energy suppliers 102-1 through 102-M based on the contribution level.

According to some example embodiments, it is possible to minimize an energy loss by distributing an energy based on a priority of an energy consumer.

According to some example embodiments, it is possible to maximize an energy distribution gain of an energy consumer by distributing an energy based on a priority of the energy consumer.

According to some example embodiments, it is possible to effectively and stably manage a supply and a demand of energy by distributing the energy based on a priority of an energy consumer.

The method according to an example embodiment may be recorded as a program to be executable in a computer and may be implemented as various record mediums, for example, a magnetic storage medium, an optical readable medium, and a digital storage medium.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A priority-based energy distribution method performed by an energy distribution system, the method comprising:
    receiving an energy distribution request including information on demand energy amounts from energy consumers;
    determining a priority of each of the energy consumers with respect to each of energy suppliers;
    determining an optimal energy amount of each of the energy consumers based on the determined priority, the demand energy amounts, and available distribution energy resources of the energy suppliers; and
    distributing energies of the available distribution energy resources to the respective energy consumers based on the determined optimal energy amount,
    wherein the determining of the optimal energy amount comprises:
    determining an energy distribution gain for each of the energy consumers using a weight of the priority, an energy amount of each of the energy consumers, the received energy distribution request, and the determined priority, in response to a sum of energies requested by the energy consumers being greater than a sum of energies of the available distribution energy resources; and
    determining, as the optimal energy amount, an energy amount of each of the energy consumers corresponding to a maximum sum of the determined energy distribution gains for all of the energy consumers,
    wherein the energy distribution gain is determined using a utility function including the weight of the priority and the energy amount of each of the energy consumers, the received energy distribution request, and the determined priority.

2. The method of claim 1, wherein the energy distribution request includes information on a position of each of the energy consumers.

3. The method of claim 1, further comprising:
    receiving a registration request for distribution energy resources from the energy suppliers;
    registering the distribution energy resources using the received registration request; and
    determining the available distribution energy resources among the registered distribution energy resources.

4. The method of claim 1, wherein the determining of the priority comprises determining the priority of each of the energy consumers using a distance between each of the energy consumers and each of the energy suppliers.

5. The method of claim 1, wherein the determining of the optimal energy amount comprises determining an energy requested by each of the energy consumers as the optimal energy amount of each of the energy consumers in response to a sum of the demand energy amounts being less than or equal to a sum of energy amounts of the available distribution energy resources.

6. The method of claim 1, wherein the optimal energy amount corresponds to the maximum sum of the determined energy distribution gains and is determined using a Karush-Kuhn-Tucker (KKT) condition.

7. The method of claim 1, further comprising:
evaluating a contribution level of each of the energy suppliers with respect to the distributed energies; and
providing the energy suppliers with a reward based on the evaluated contribution level.

8. The method of claim 1, further comprising:
storing the determined priority in priority history information of each of the energy consumers,
wherein the determining of the optimal energy amount comprises determining the optimal energy amount of each of the energy consumers based on the available distribution energy resources of the energy suppliers and the priority history information, the demand energy amounts, and the determined priority.

9. A priority-based energy distribution system for performing a priority-based energy distribution method, the system comprising:
a memory configured to store the priority-based energy distribution method; and
a processor configured to perform the priority-based energy distribution method,
wherein the processor is configured to perform receiving of an energy distribution request including information on demand energy amounts from energy consumers, determining of a priority of each of the energy consumers with respect to each of energy suppliers, determining of an optimal energy amount of each of the energy consumers based on the determined priority, the demand energy amounts, and available distribution energy resources of the energy suppliers, and distributing of energies of the available distribution energy resources to the respective energy consumers based on the determined optimal energy amount,
wherein the determining of the optimal energy amount comprises:
determining an energy distribution gain for each of the energy consumers using a weight of the priority, an energy amount of each of the energy consumers, the received energy distribution request, and the determined priority, in response to a sum of energies requested by the energy consumers being greater than a sum of energies of the available distribution energy resources; and
determining, as the optimal energy amount, an energy amount of each of the energy consumers corresponding to a maximum sum of the determined energy distribution gains for all of the energy consumers,
wherein the energy distribution gain is determined using a utility function including the weight of the priority and the energy amount of each of the energy consumers, the received energy distribution request, and the determined priority.

10. The system of claim 9, wherein the processor is further configured to perform receiving of a registration request for distribution energy resources from the energy suppliers, registering of the distribution energy resources using the received registration request, and determining of the available distribution energy resources among the registered distribution energy resources.

11. The system of claim 9, wherein the determining of the optimal energy amount comprises determining an energy requested by each of the energy consumers as the optimal energy amount of each of the energy consumers in response to a sum of the demand energy amounts being less than or equal to a sum of energy amounts of the available distribution energy resources.

* * * * *